Oct. 24, 1939.   H. BAADE   2,177,471

CLUTCH CONTROL MECHANISM

Filed Jan. 31, 1936   3 Sheets-Sheet 1

INVENTOR.
HENRY BAADE
BY
ATTORNEY

Oct. 24, 1939.  H. BAADE  2,177,471

CLUTCH CONTROL MECHANISM

Filed Jan. 31, 1936  3 Sheets-Sheet 2

INVENTOR.
HENRY BAADE
BY H. O. Clayton
ATTORNEY

INVENTOR.
HENRY BAADE
BY H. O. Clayton
ATTORNEY.

Patented Oct. 24, 1939

2,177,471

UNITED STATES PATENT OFFICE 2,177,471

CLUTCH CONTROL MECHANISM

Henry Baade, South Bend, Ind., assignor to Bendix Products Corporation, South Bend, Ind., a corporation of Indiana Application January 31, 1936, Serial No. 61,694

8 Claims. (Cl. 192—.01)

This invention relates to power means for operating the clutch, or brakes, or transmission of an automotive vehicle.

It is the principal object of the invention to provide an accelerator operated pilot valve for controlling the operation of a pressure differential operated relay valve, the latter directly controlling the operation of a motor operably connected to the clutch, or brakes, or transmission. Such a construction makes possible a power operation of any one of the clutch, brakes or transmission of an automotive power plant, said mechanisms being located remotely from the driver's compartment. For example, the invention finds use with the present type of rear or front engine mounts in automotive vehicles.

A further object of the invention is to provide a compact type of pilot valve mechanism so located with respect to the accelerator pedal as to be effectively operated thereby.

Yet another object of the invention is to provide a clutch, or brake, or transmission operating power mechanism of the vacuum suspended type, wherein said mechanism simulates a conventional manual operation of any one of these controls by operating the same in two stages of movement.

Other features of the invention, including the provision of a compact type of combined three-way, cut-out and bleed clutch control valve, a simple and effective type of follow-up valve for a power clutch, an efficient check valve, an effective type of piston construction, and other features, combinations, and subcombinations of elements, will become apparent from the following detailed description of certain preferred embodiments of my invention, taken in conjunction with the accompanying drawings, in which:

Figure 1 is a diagrammatic layout of a preferred form of clutch, or brake, or transmission operating power mechanism, the mechanism being shown connected to a clutch;

Figure 2 discloses, in section, the most essential elements of the mechanism of Figure 1, including the operating motor together with the relay and pilot valves therefor;

Figure 3 discloses another sectional view of the pilot valve;

Figure 1:
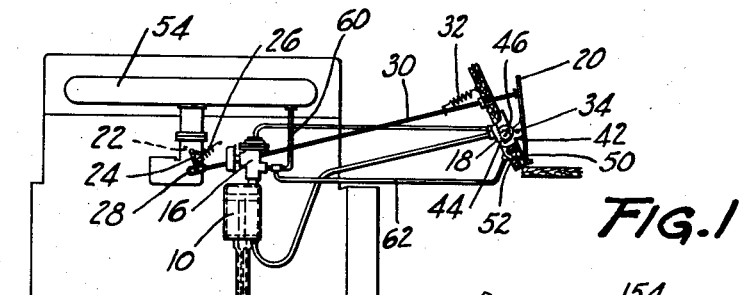
Figures 2, 3:
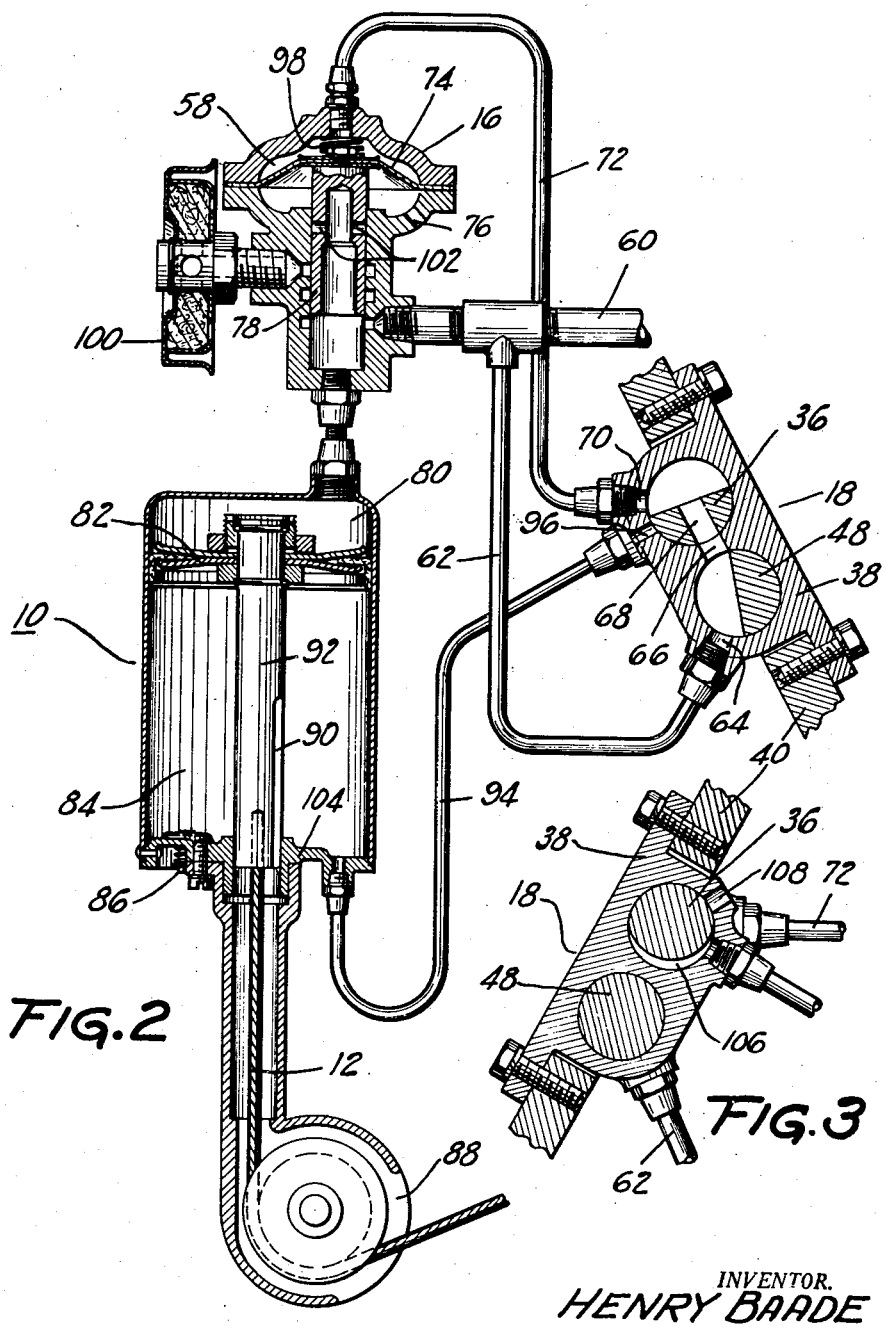
Figure 6:
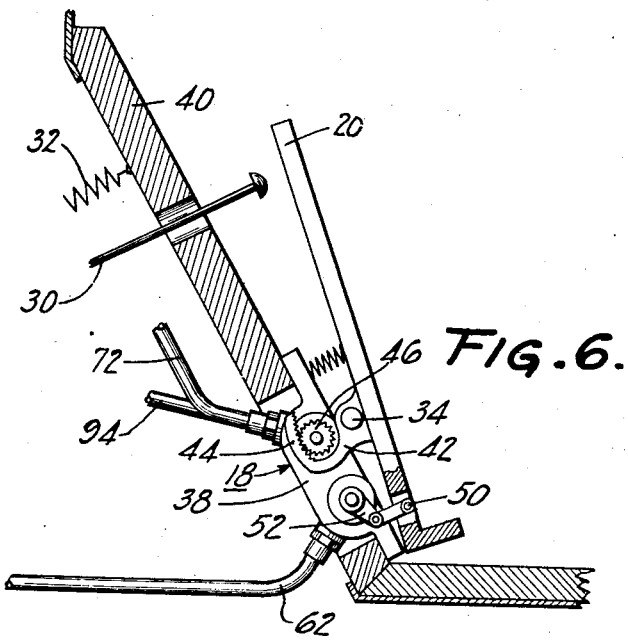
Figure 6 is an enlarged view of the accelerator operated pilot valve disclosed in Figure 1.

Referring to that embodiment of the invention disclosed in Figures 1, 2 and 3, a pressure differential operated clutch operating motor 10 is operatively connected by a cable 12 with a clutch 14. The operation of the motor 10 is controlled by a pressure differential operated relay valve 16, preferably mounted on the motor casing, and by a pilot valve 18, preferably operated by an accelerator 20.

Proceeding now to a discussion of the operation of the aforementioned mechanism in which the parts of such mechnasism will be described in detail, partial release of the accelerator permits a throttle or butterfly valve 22 to be closed by a crank 24 actuated by a return spring 26. Complete release of the accelerator serves, by virtue of a lost motion connection 28 in a throttle link 30 and the action of a return spring 32, to rotate the accelerator clockwise about a pivot 34. With this operation a cylindrically shaped valve plunger 36, rotatably mounted in a casing 38 secured to the floorboard 40, is rotated clockwise about its axis to the position disclosed in Figure 2. The connection between the accelerator and valve 36 comprises a crank 42 provided at its ends with a rack 44 in mesh with a pinion 46 secured to the valve. A cylindrically shaped valve member 48, also rotatably mounted in the casing 38, is also rotated clockwise with this release movement of the accelerator, stopping in the position disclosed in Figure 2. The connection between the accelerator and valve 48 comprises a pin 50 and a crank 52.

In this position of the valve parts an intake manifold 54 of an internal-combustion engine 56 is placed in fluid transmitting connection with an upper compartment 58 of the relay valve 16 by means of conduits 60 and 62, port 64, valve 48, port 66, a duct 68 in valve member 36, port 70, and conduit 72. A diaphragm 74 of the relay valve, subject to atmospheric pressure by virtue of a port 76, is accordingly moved upwardly to the position disclosed in Figure 2, carrying with it to the position disclosed in the figure a relay valve plunger 78. An upper compartment 80 of the clutch motor is thus connected directly with the manifold via conduit 60, resulting in a partial evacuation of said compartment. A piston 82 of the clutch motor is, by virtue of the pressure of the atmosphere acting on its lower side, moved upwardly to the position disclosed in Figure 2 to disengage the clutch. In this operation, atmosphere enters a lower compartment 84 of the motor 10 via a one-way valve 86.

Should the driver now wish to engage the clutch, the accelerator is depressed, the first increment of movement functioning to rotate the valves 36 and 48 counterclockwise to cut off communication between the manifold and relay valve and interconnect the compartment 58 of the relay with the atmosphere via port 88 in the clutch motor, a slot 90 in a piston rod 92, compartment 84 of motor 10, a conduit 94, a port 96, port 70 and conduit 72.

The compartment 58 of the relay valve mechanism is accordingly brought up to atmospheric pressure, automatically permitting a spring 98, acting on the diaphragm 74, to move the diaphragm and its connected valve member 78 downwardly to vent the clutch motor compartment 80 to the atmosphere via an air cleaner 100 and valve ports 102. The piston 82 is accordingly permitted to move downwardly under the action of the clutch springs, the rate of its movement and consequent rate of engagement of the clutch being determined by the rate of egress of air from the motor compartment 84. The air is forced out relatively rapidly, to effect a relatively rapid first stage of clutch plate movement up to a point at which said plates engage, via the aforementioned slot 90 in the piston rod 92. After the slot 90 is covered by the end plate 104, the forcing of air from the compartment 84 is continued at a relatively slow rate, via conduit 94, a crescent-shaped slot 106 in the valve 36 and a port 108, as disclosed in Figure 3. The final or driving engagement of the clutch is thus slowed up to effect a cushioned engagement, the rate or rather the mode of said final engagement being determined by the mode of operation of the accelerator as it rotates the valve 36 to register the slot 106 with the port 108.

Figure 5:
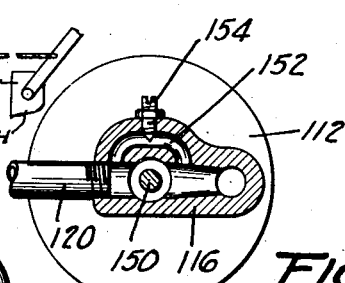
Figure 5 is a sectional view, taken on the line 5—5 of Figure 4, disclosing a portion of the valve constituting the mechanism of said figure.
Figure 4:
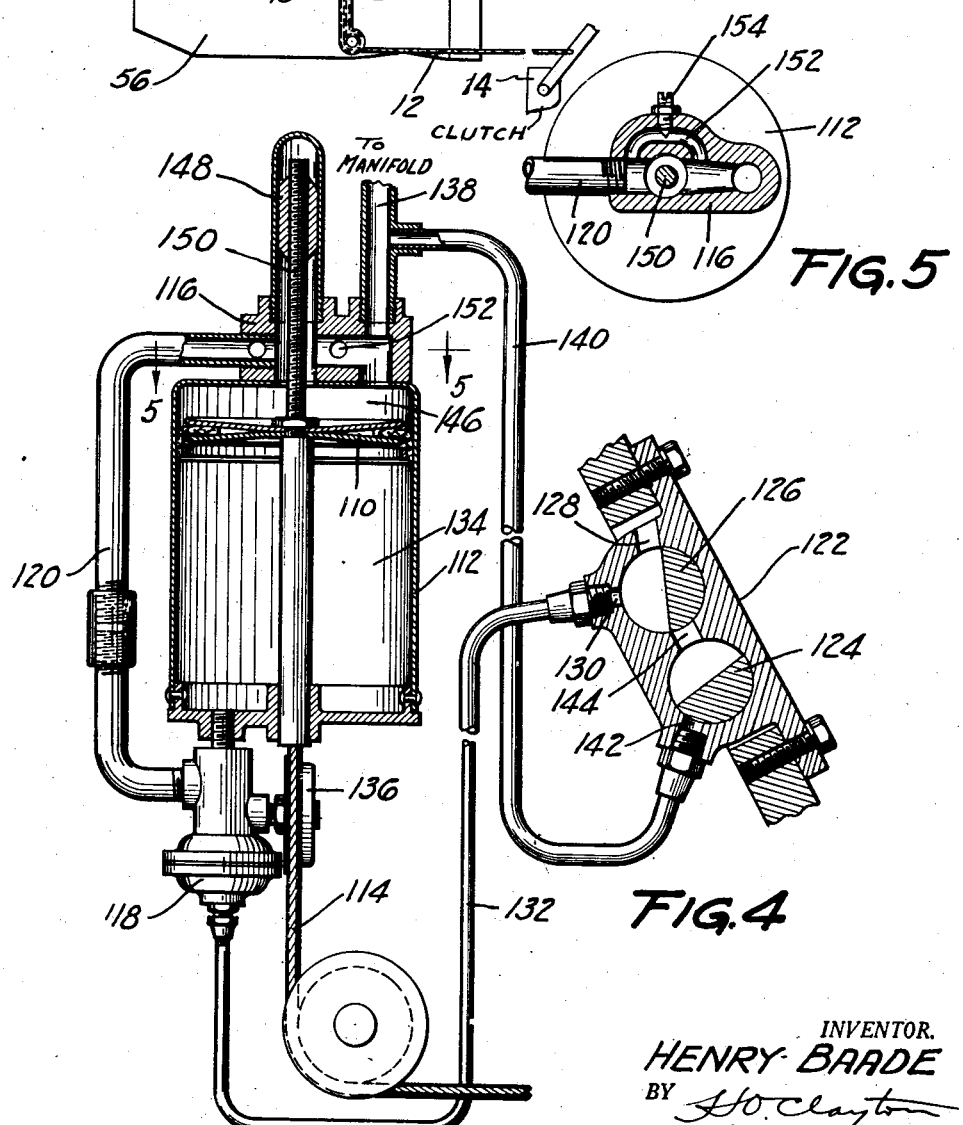
Figure 4 is a view, similar to that of Figure 2, disclosing a vacuum suspended type of clutch, or brake, or transmission operating mechanism.

There is disclosed in Figures 4 and 5 a clutch control mechanism of the vacuum suspended type, the previously described mechanism being of the air suspended type. As disclosed in Figure 4, a piston 110, reciprocably mounted in a double-ended cylinder 112, is operably connected to a clutch, not shown, by means of a cable 114. To the upper end of the cylinder 112 is secured a valve casing 116 which is connected to a relay valve 118, similar to that disclosed in Figures 1 and 2, by means of a conduit 120. As with the mechanism of Figures 1 and 2, the operation of the relay valve is controlled by an accelerator operated pilot valve 122.

Describing the operation of the mechanism of Figure 4, upon release of the accelerator, valves 124 and 126 are rotated by the accelerator, in a manner previously described, to the position disclosed in Figure 4. The relay valve 118 is thus connected with the atmosphere via ports 128 and 130 of the valve 122 and a conduit 132 to so operate the relay valve as to vent a lower chamber 134 of the clutch motor to the atmosphere via an air cleaner 136. The piston 110 is thus moved upwardly to the position disclosed in Figure 4 to disengage the clutch.

Should an engagement of the clutch be desired, the accelerator is depressed, whereupon the valves 124 and 126 are rotated counterclockwise to connect the relay valve 118 with the intake manifold via conduits 138 and 140, ports 142, 144 and 130, and conduit 132.

The relay valve is accordingly operated to interconnect the chamber 134 with an upper motor chamber 146 and the manifold via conduit 120. The engagement of the clutch is immediately initiated by the action of the clutch springs, the first phase of the engagement being relatively rapid by virtue of the relatively rapid by-passing of air from the compartment 134 to the manifold and compartment 146. When the piston 110 has moved sufficiently to just engage the clutch plates, a valve member 148, threadedly mounted on a stem 150 extending upwardly from the piston 110, enters the valve body to terminate the aforementioned by-passing of air by blocking the communications between the conduit 120 and the chamber 146 and manifold, all as is made apparent from an inspection of Figure 4. The remainder of the clutch engagement is effected at a relatively slow rate by restricting the flow of air from the chamber 134 to the chamber 146 and manifold via a by-pass 152, Figure 5, adjustable by a needle valve member 154.

There is thus provided, in both of the above-described air and vacuum suspended mechanisms, power means for operating an automotive clutch to in general simulate a conventional manual operation thereof. In both mechanisms, the clutch is engaged relatively rapidly until the clutch plates contact, whereupon the remainder of the engagement is relatively slow to effect a smooth start of the vehicle. As previously suggested, both clutch controlling systems are adaptable to an automotive vehicle, wherein the engine, clutch and other principal elements of the power plant are mounted at the rear of the vehicle; for with the relay mechanism of the invention, particularly the vacuum suspended system, the pilot valve may be conveniently mounted in the driver's compartment and the remainder of the clutch control mechanism mounted adjacent the power plant. The mechanism may also be employed to operate a brake or transmission with but slight modification of the construction.

Figure 7:
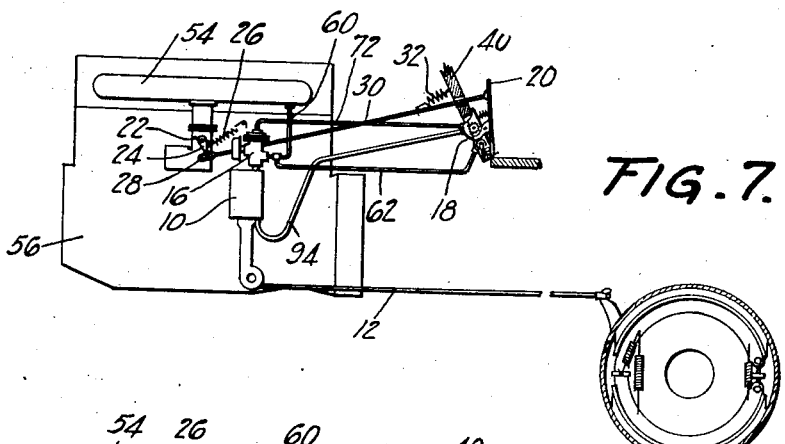
Figure 7 is a view, similar to Figure 1, showing the power mechanism of my invention connected to operate the brakes of the vehicle.

As disclosed in Figure 7, the power mechanism of my invention is shown as connected to the brakes of the vehicle, for the cable 12 may be connected to the brake operating cross-shaft or to any other part of any one of the conventional brake operating hook-ups of the day. A detailed description of the operation of the power mechanism to operate the brakes will not be given, inasmuch as the operation of the mechanism to actuate the clutch has been described in detail. Suffice it to say that if the accelerator is completely released, that is, further released after the throttle is closed, either the pilot valve 18 or the valve 122 will be operated to effect an energization of the pressure differential operated motor to apply the brakes.

Figure 8:
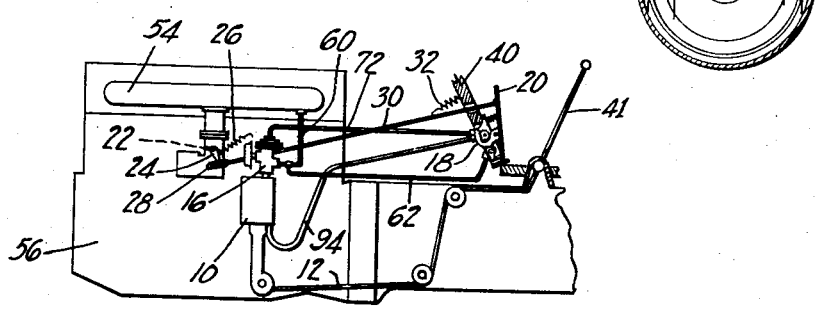
Figure 8 is a view, similar to Figures 1 and 7, disclosing the power mechanism connected to the change-speed transmission of the vehicle.

Referring now to the mechanism disclosed in Figure 8, when the driver of the vehicle wishes to employ the power means, say, to place the transmission in low gear, he merely moves the shift lever 41 to the left to select the low and reverse shift rail of the transmission and then completely releases the accelerator to operate the pilot valve. The pressure differential operated motor is then energized to move the shift lever and to place the transmission in low gear.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with an accelerator and a clutch, power means for operating the clutch comprising a pressure differential operated clutch motor operably connected with the clutch, and valve mechanism for controlling the operation of said motor comprising a relay valve mechanism mounted on the motor and a pilot valve operated by the accelerator.

2. In an automotive vehicle provided with an accelerator and a clutch, power means for operating the clutch comprising a pressure differential operated clutch motor operably connected with the clutch, and valve mechanism for controlling the operation of said motor comprising a relay valve mechanism mounted on the motor and a pilot valve operated by the accelerator, said pilot valve comprising means operable by the heel portion of the accelerator when the same is rocked clockwise.

3. In an automotive vehicle provided with an accelerator and a clutch, power means for operating the clutch comprising a pressure differential operated clutch motor operably connected with the clutch, and valve mechanism for controlling the operation of said motor comprising a relay valve mechanism mounted on the motor and a pivot valve operated by the accelerator, said relay mechanism comprising a pressure differential operated diaphragm member for operating a three-way valve plunger member.

4. In an automotive vehicle provided with an accelerator and a clutch, a vacuum suspended power mechanism for operating the clutch, said mechanism comprising a double-ended pressure differential operated motor operably connected to the clutch, and control valve mechanism for said motor comprising a relay valve mounted in one end of said motor and a bleed valve mechanism mounted in the other end of said motor.

5. In an automotive vehicle provided with an accelerator and a clutch, a vacuum suspended power mechanism for operating the clutch, said mechanism comprising a double-ended pressure differential operated motor operably connected to the clutch, and control valve mechanism for said motor comprising a relay valve mounted in one end of said motor, a bleed valve mechanism mounted in the other end of said motor, and a pilot valve actuated by the accelerator.

6. In an automotive vehicle provided with an accelerator and a clutch, a vacuum suspended power mechanism for operating the clutch, said mechanism comprising a double-ended pressure differential operated motor operably connected to the clutch, and control valve mechanism for said motor comprising a relay valve mounted in one end of said motor, a bleed valve mechanism mounted in the other end of said motor, and a pilot valve actuated by the accelerator, said bleed valve mechanism comprising means for effecting two stages of clutch engaging operation of said motor.

7. In an automotive vehicle provided with an accelerator, and means operable, together with other mechanism such as the internal-combustion engine, for controlling the speed of the vehicle, power means adapted to operate said means, said power means comprising a pressure differential operated motor, and control valve means for said motor comprising a pilot valve operated by the accelerator and a relay valve controlled by said pilot valve and serving to control the operation of said motor.

8. In an automotive vehicle provided with an accelerator, and means operable, together with other mechanism such as the internal-combustion engine, for controlling the kinetic energy of the vehicle, power means adapted to operate said means said power means comprising a pressure differential operated motor, and control valve means for said motor comprising a pilot valve operated by the accelerator and a relay valve controlled by said pilot valve and serving to control the operation of said motor, said pilot valve comprising a plurality of rotatable valve members operable by the heel portion of the accelerator.

HENRY BAADE.